(12) United States Patent
Saar et al.

(10) Patent No.: US 6,430,514 B1
(45) Date of Patent: Aug. 6, 2002

(54) WATER MANAGEMENT SYSTEM

(76) Inventors: David A. Saar, 37 Todd Ridge Rd., Titusville, NJ (US) 08560; Wade W. Smith, 3311 Round Hill Rd., Branchburg, NJ (US) 08876

( * ) Notice: Subject to any disclaimer, the term of this patent is extended or adjusted under 35 U.S.C. 154(b) by 85 days.

(21) Appl. No.: 09/697,668

(22) Filed: Oct. 26, 2000

(51) Int. Cl.$^7$ ................................................ G01F 23/00
(52) U.S. Cl. ........................ 702/45; 702/55; 702/130; 340/870.02; 73/53.04
(58) Field of Search .................... 702/45.46, 55, 702/130; 73/53.04, 54.07, 61.77, 61.79; 340/870.11, 870.02, 870.05, 870.17, 615; 705/400, 412, 413

(56) References Cited

U.S. PATENT DOCUMENTS

| | | | | |
|---|---|---|---|---|
| 4,509,679 A | * | 4/1985 | Longini | 236/94 |
| 5,287,570 A | * | 2/1994 | Peterson et al. | 4/625 |
| 5,838,258 A | * | 11/1998 | Saar | 137/552 |
| 5,969,267 A | * | 10/1999 | Smith et al. | 340/615 |
| 5,979,776 A | * | 11/1999 | Williams | 236/12.12 |
| 6,101,451 A | * | 8/2000 | Smith et al. | 702/130 |
| 6,161,100 A | * | 12/2000 | Saar | 340/870.02 |

* cited by examiner

*Primary Examiner*—Kamini Shah
(74) *Attorney, Agent, or Firm*—Spencer T. Smith

(57) ABSTRACT

A system is disclosed for monitoring the use of water supplied by a pipe to a device that discharges water during use. A meter generates information indicating the volume of water is flowing through the pipe and the temperature times the volume thereof which is transmitted to a host computer. The host computer determines the average temperature of the water by dividing the temperature times volume data by the volume data and corrects the volume data for any temperature difference above a reference cold water temperature.

8 Claims, 3 Drawing Sheets

WATER MANAGEMENT SYSTEM

The present invention relates to a system for monitoring the use of water in an apartment unit.

BACKGROUND OF THE INVENTION

Today there is a great emphasis on conserving water. Showerheads and faucets may be designed to restrict flow to a maximum flow rate. The toilet may also be designed to use no more than 1.6 gallons per flush.

U.S. Pat. Nos. 5,838,258 and 6,101,451, disclose systems wherein each pipe, which discharges water in an apartment, etc., has a monitor attached thereto to determine the flow of the pipe and the temperature of the water flowing through the pipe. With this information the total volume of water used in the unit and the heat energy added to the water can be calculated. When users are billed for these resources, the use of these resources will decrease.

OBJECT OF THE INVENTION

It is an object of the present invention to provide a system which can enhance the accuracy of volumetric calculations in such systems.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE DRAWINGS

FIG. 1 is a schematic drawing of a water supply system for an apartment or the like;

BRIEF DESCRIPTION OF THE PREFERRED EMBODIMENT

Figure 1:
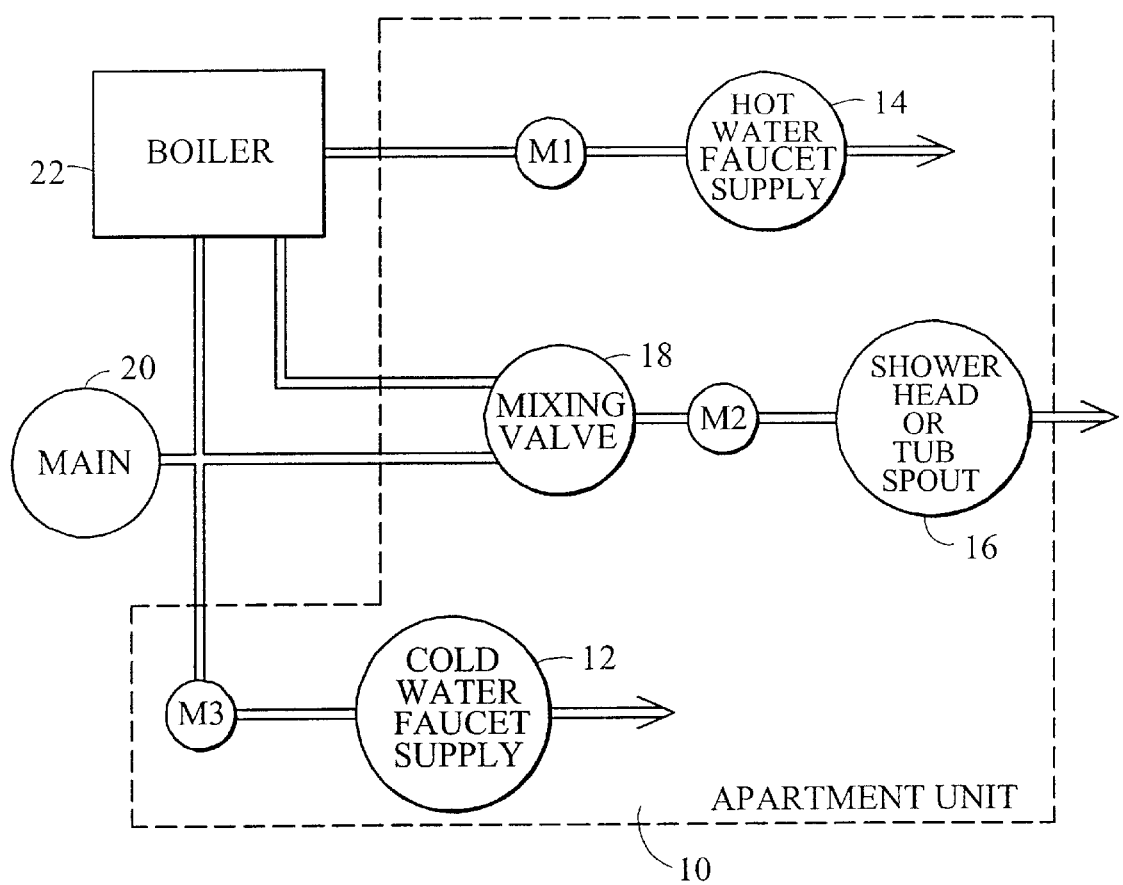

FIG. 1 schematically illustrates an apartment unit 10 which includes a number of water consuming (using) devices such as a cold water faucet 12, a hot water faucet 14 and a shower head or tub spout 16. It should be understood that an apartment unit may have a number of hot and cold water faucets as well as a number of shower heads and tub spouts but only one of each is shown for clarity. Located in the input line to each water using device is a monitor (M1,M2,M3) which can determine when a unit volume of water has flowed through the line and the temperature of the water at that location when that determination is made. Upstream of the monitor M2 for the shower head or tub spout 16 is located a mixing valve 18 which mixes cold water supplied directly from the main 20 and hot water supplied from the apartment complex boiler 22. A state of the art monitor is disclosed in Ser. No. 09/524,502, filed Mar. 3, 2000.

Figure 2:
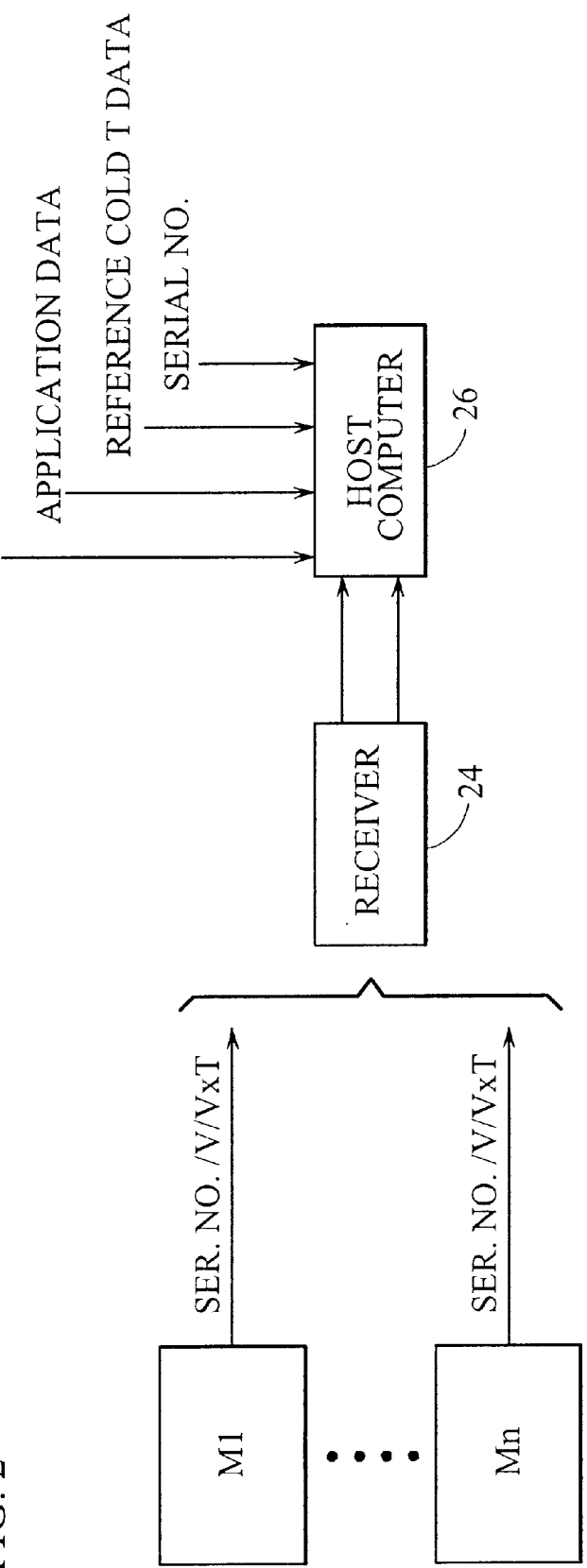
FIG. 2 is a schematic drawing illustrating the transmission of this data from the water using devices to a remote receiver for retransmission to host computer.

Conventionally each monitor (FIG. 2) generates flow related data (V) by, for example, sensing targets on a rotating flow driven impeller, and maintaining a running total of these counts. The monitor can also determine the temperature (T) of the water flowing through the pipe when a target is sensed so that energy relevant data can be defined within the monitor by multiplying the unit volume of flow by the temperature (V×T). A running total of this data is also maintained. The monitor periodically transmits a data packet which includes an identifying code or serial number, V and V×T to a receiver 24 for retransmission to a host computer 26. In the preferred embodiment, the individual who installs the monitor records information including the monitor serial number, location data including the identification of the apartment unit and the apartment, application data, for example, water closet cold, sink cold side, etc., and temperature data, such as the identification of the monitor which has been installed proximate the apartment house meter to provide the reference cold water temperature. The host computer 26 receives this discrete data for each of the monitors.

Figure 3:
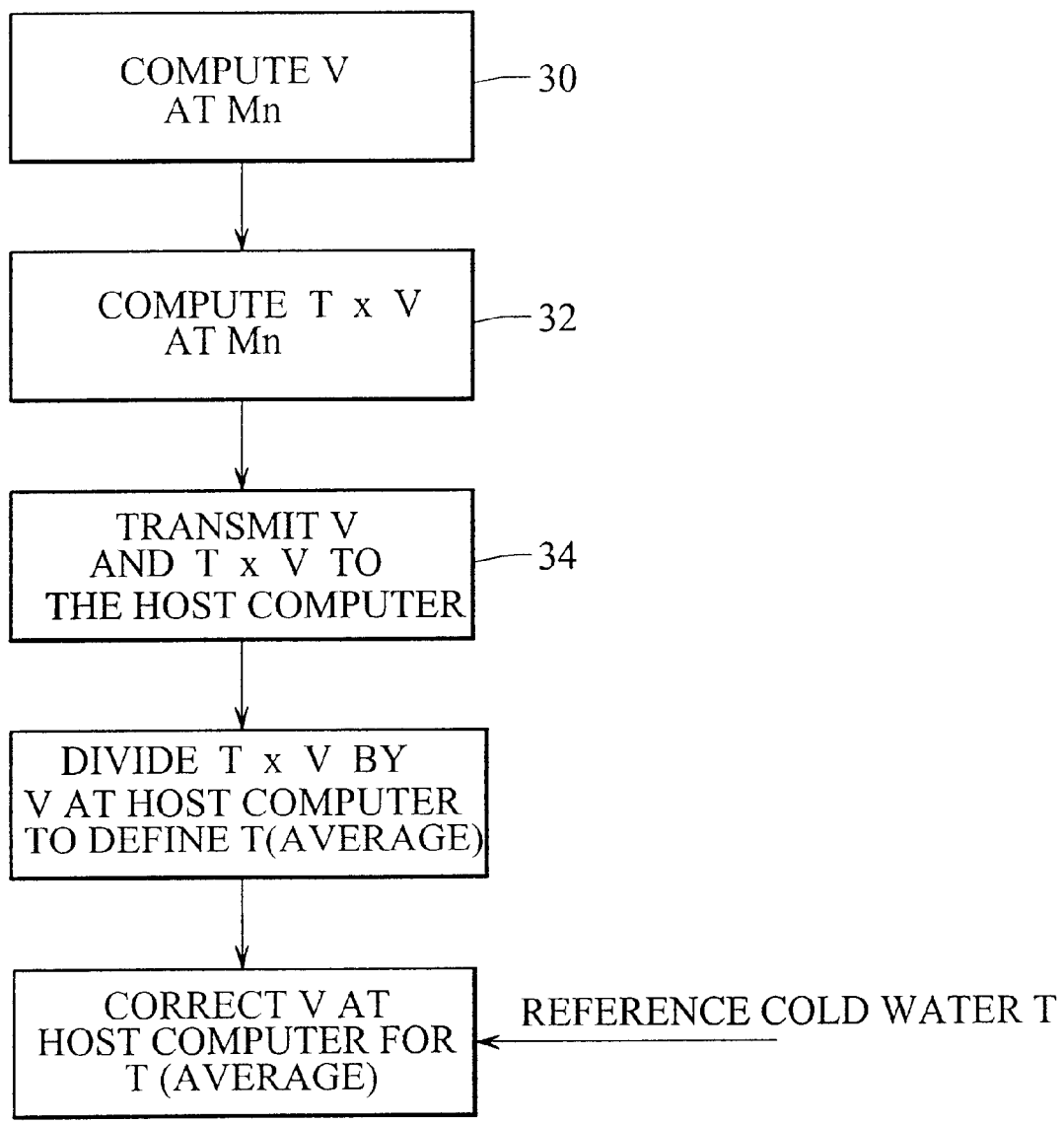
FIG. 3 is a logic diagram illustrating the algorithm for improving the accuracy of the flow monitoring system.

As shown in FIG. 3, each monitor Mn Compute(s) V at Mn 30 and by multiplying the volume V by the temperature T when each V increment is determined, Computes T×V at Mn 32 (this number may include constants which can equate units to BTU's and can also include units for facilitating handling of the data—a divide by Y number to reduce the number of digits for example. The next step is to Transmit T and T×V To The Host Device 34 (periodically via a receiver). The host computer 26 periodically receives this information from each monitor within an apartment unit and with the data input into the host computer, the host computer can Divide T×V by V At Host Computer To Define T (average) 36.

The next step is to Correct V At Host Computer for T (Average) 38. To make this correction a Reference Cold Water Temperature is required which can be obtained in any number of ways. A monitor can be located at the water inlet to the apartment house where the main meter is located and the operator can input this serial number as the source of the Reference Cold Water Temperature. The operator can also input into the host computer the code for a specific monitor in the unit which can be used as the source of the reference cold water temperature. The host computer could also define an average cold water temperature based on the temperature of cold water at all the cold water monitors within the unit or building or the host computer could scan all the monitors in the entire apartment house to find the coldest temperature and then use that temperature. The operator might also input the reference temperature (56° F.) for example, which could be the measured temperature of underground water at the site which is metered by the main meter to the apartment complex.

Should the average temperature of the monitored water be higher than the cold water reference temperature (this could be true for either cold or hot water lines), a computed volume, at a specific monitor, can be corrected for this temperature difference. The correction can be made knowing the density of the water at the two different temperatures by multiplying the volume by a ratio of the densities for the different temperatures. The host computer may have an algorithm that translates temperatures into densities or it can have this information in the form of a look up table.

What is claimed is:

1. A system for monitoring the use of water within an apartment unit comprising
   a monitor for metering the temperature and flow of water through a pipe to a device which discharges water wherein the monitor defines flow volume and flow volume times temperature data and for transmitting this data,
   a computer for receiving the flow volume and flow volume times temperature information, said computer comprising means for dividing said flow volume times temperature by the flow volume to define an average temperature and correcting the flow volume for any difference between the average temperature and a reference cold water temperature.

2. A system for monitoring the use of water within an apartment unit according to claim 1, wherein said monitor additionally transmits a monitor identifying code.

3. A system for monitoring the use of water within an apartment unit according to claim 2, wherein said computer has inputted the monitor identifying codes of all the monitors within the apartment unit and wherein the reference cold water temperature is the temperature of the water monitored by a monitor having a selected one of said identifying codes.

4. A system for monitoring the use of water within an apartment unit according to claim 2, wherein said computer has inputted the monitor identifying codes of all the monitors within the apartment and wherein the reference cold water temperature is the average temperature of the water monitored by a selected plurality of monitors having said identifying codes.

5. A system for monitoring the use of water within an apartment unit according to claim 2, wherein said computer has inputted the monitor identifying codes of all the monitors within the apartment and wherein the reference cold water temperature is the temperature of the water monitored by a monitor having a selected one of said identifying codes.

6. A system for monitoring the use of water within an apartment unit according to claim 2, wherein a monitor is located on the intake line for water into the apartment house and said computer has inputted the monitor identifying code for said monitor at the intake line and wherein the reference cold water temperature is the temperature of the water monitored by said monitor at the intake line.

7. A system for monitoring the use of water within an apartment unit according to claim 2, wherein said computer has inputted the monitor identifying codes of all the monitors within the apartment and wherein the reference cold water temperature is the temperature of the water monitored by the monitor having the lowest temperature.

8. A system for monitoring the use of water within an apartment unit according to claim 2, wherein monitors are located throughout the apartment building wherein the apartment unit is located and said computer has inputted the monitor identifying codes of all the monitors within the apartment building and wherein the reference cold water temperature is the temperature of the water monitored by a monitor monitoring water having the lowest temperature.

* * * * *